Sept. 25, 1934.  M. M. CUNNINGHAM  1,974,561
BRAKE
Filed Dec. 21, 1931

INVENTOR.
MARION M. CUNNINGHAM
BY
ATTORNEY

Patented Sept. 25, 1934

1,974,561

UNITED STATES PATENT OFFICE 1,974,561

BRAKE

Marion M. Cunningham, South Bend, Ind., assignor to Bendix Aviation Corporation, South Bend, Ind., a corporation of Delaware Application December 21, 1931, Serial No. 582,452

5 Claims. (Cl. 188—234)

This invention relates to brakes and more particularly to friction elements therefor.

Broadly, the invention comprehends a lining for friction element including a metallic member having placed thereon suitable friction material. The member is provided with means for securing the friction material against endwise movement and rivets are drawn from the member for fastening the member together with the friction material to a band or brake shoe.

An object of the invention is to provide a lining for a friction element having a part which may be deformed to attach the lining to the friction element.

Another object of the invention is to provide a lining for a friction element including a relatively thin metallic member having friction material cast thereon and means formed integral therewith for securing the friction material against endwise movement and integral means for attaching the lining.

A feature of the invention is a metallic member having raised portions on one side and rivets drawn from the body of the metallic member protruding from the other side.

Other objects and features of the invention will appear from the following description taken in connection with the drawing, and in which.

Figure 1:
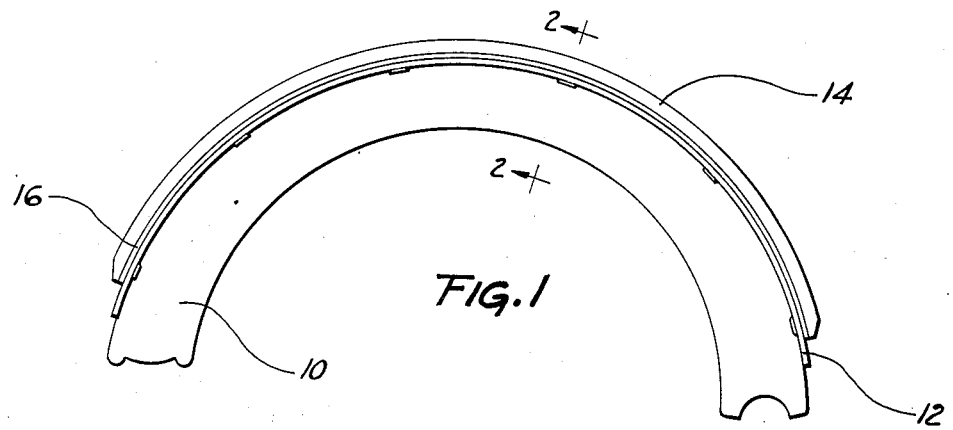
Figure 1 is a side elevation of a brake shoe illustrating the invention as applied.
Figure 2:
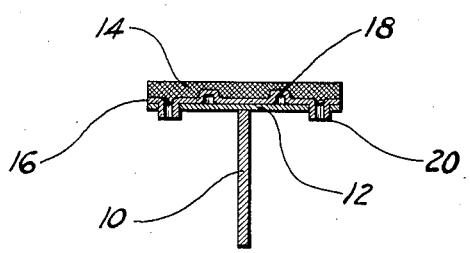
Figure 2 is a sectional view substantially on the line 2—2, Figure 1.
Figure 3:
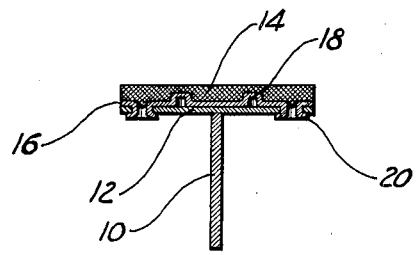
Figure 3 is a similar view showing the rivets upset.

Referring to the drawing for more specific details of the invention, 10 represents the web of a brake shoe supporting a rim 12 to which may be secured a lining 14. As shown, the lining includes a flexible metallic backing member 16 having embossed or raised portions 18 arranged thereon at suitable intervals throughout its length, so that endwise movement of suitable friction material cast or otherwise formed on the backing member 16 may be avoided.

The backing member 16 also has arranged thereon spaced hollow rivets 20. The rivets are preferably drawn from the body of the member 16. They protrude from the member on the side thereof opposite the embossed or raised portions 18. The rivets are arranged to register with suitable openings in the rim 12 and to extend through the openings sufficiently that they may be readily upset to secure the backing member together with the friction material to the rim of the shoes.

In practice it has been found desirable to provide rivets having relatively large diameters. It has been found that rivets of this type may be drawn from the body of the backing member without imposing excessive wear on the dies. This effecting material savings in the manufacture of the product. In addition thereto a limited quantity of the friction material cast on the backing member protrudes into the rivets and thus produces a more effective bond between the flexible backing member and the friction material.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention what I claim as new and desire to secure by Letters Patent, is:—

1. A lining for a friction element comprising a member having raised cup shaped portions on one side and hollow tubular rivets drawn from the body portion protruding from the other side.

2. A lining for a friction element comprising a member, hollow tubular rivets drawn from the body of the member, and friction material cast on the member and extending into said rivets.

3. A lining for a friction element comprising a member having an embossed surface, hollow tubular rivets drawn from the member, and friction material cast on the embossed surface and extending into said hollow rivets.

4. A lining for a friction element comprising a member having an embossed surface, relatively large tubular rivets drawn from the body of the member on the opposite side from said embossed surface, and friction material cast on the embossed surface having portions protruding into the rivets.

5. A brake comprising a friction element having openings therein, a lining for the friction element including a metallic member, relatively large rivets drawn from the body of the member and friction material having parts protruding in the rivets.

MARION M. CUNNINGHAM.